April 26, 1960 M. J. BLES 2,934,109
APPARATUS FOR CUTTING TREE STUMPS AND ROOTS
Filed Feb. 7, 1958 3 Sheets-Sheet 1
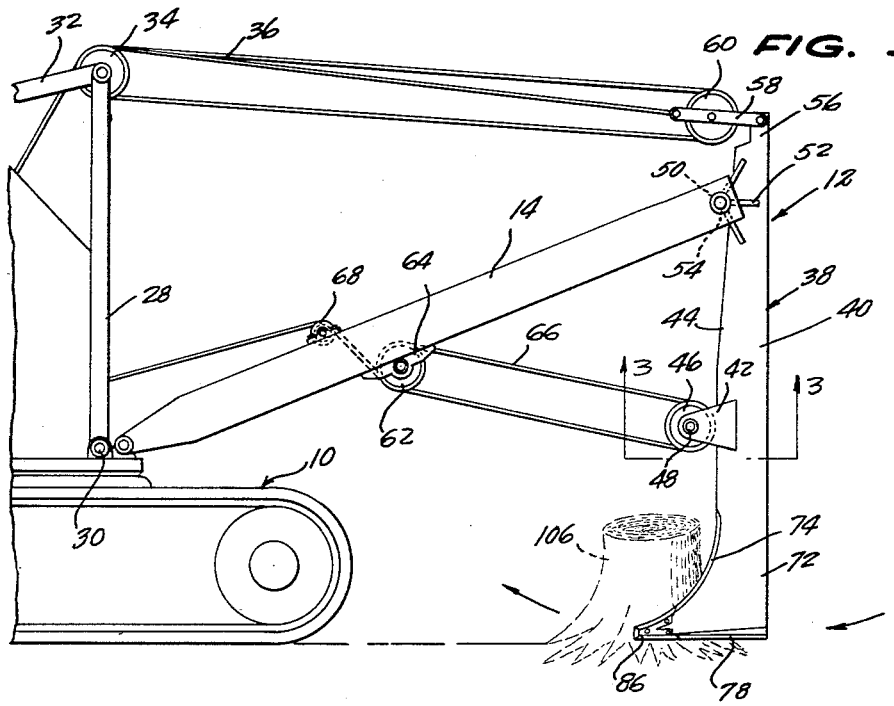
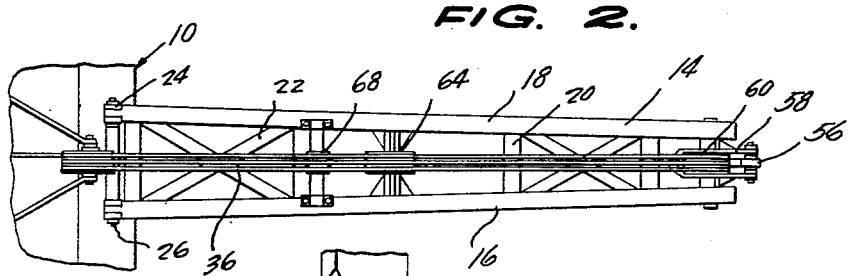
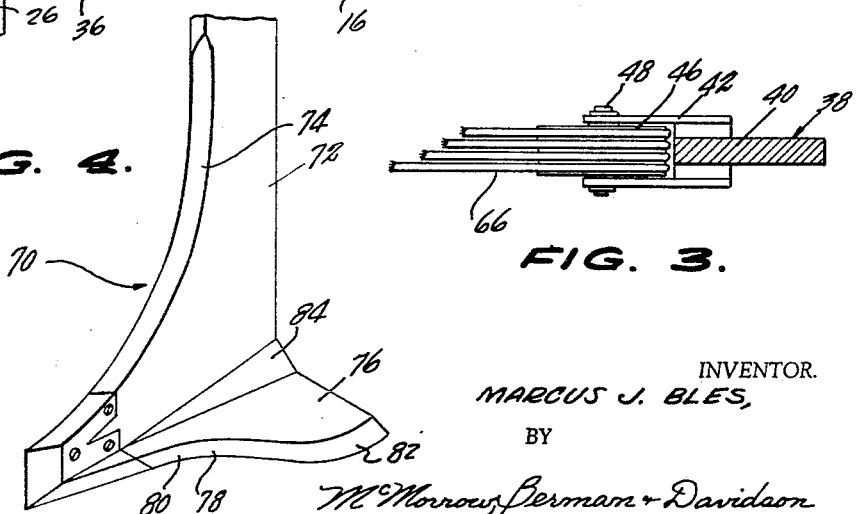
INVENTOR.
MARCUS J. BLES,
BY
McMorrow, Berman + Davidson
ATTORNEYS.

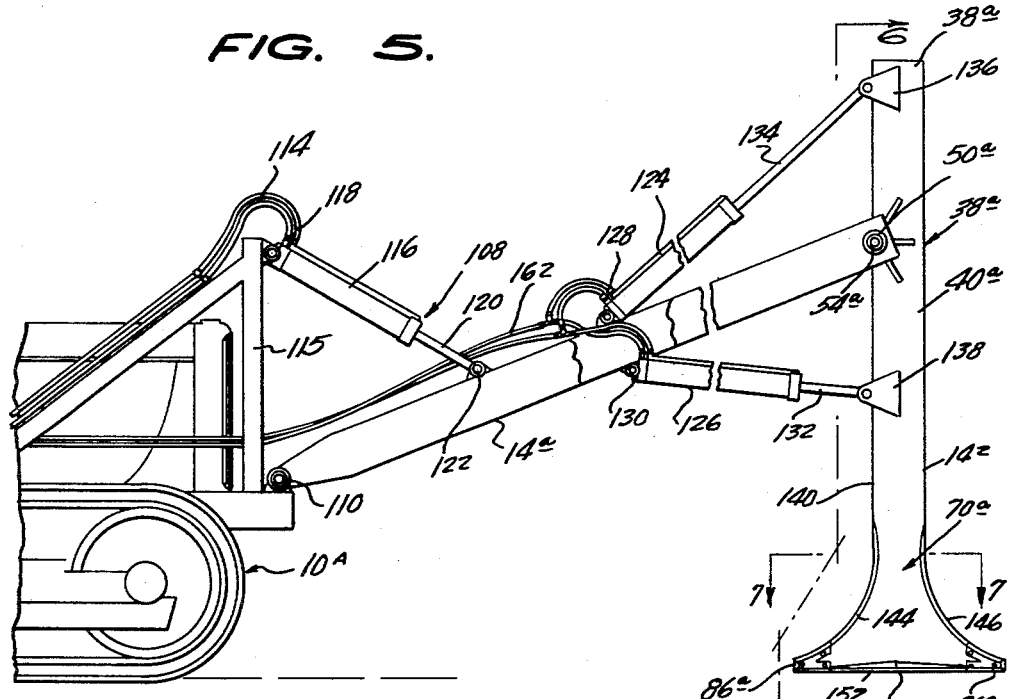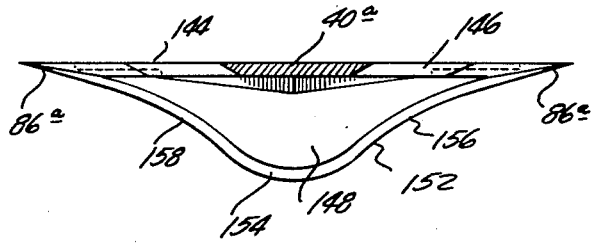

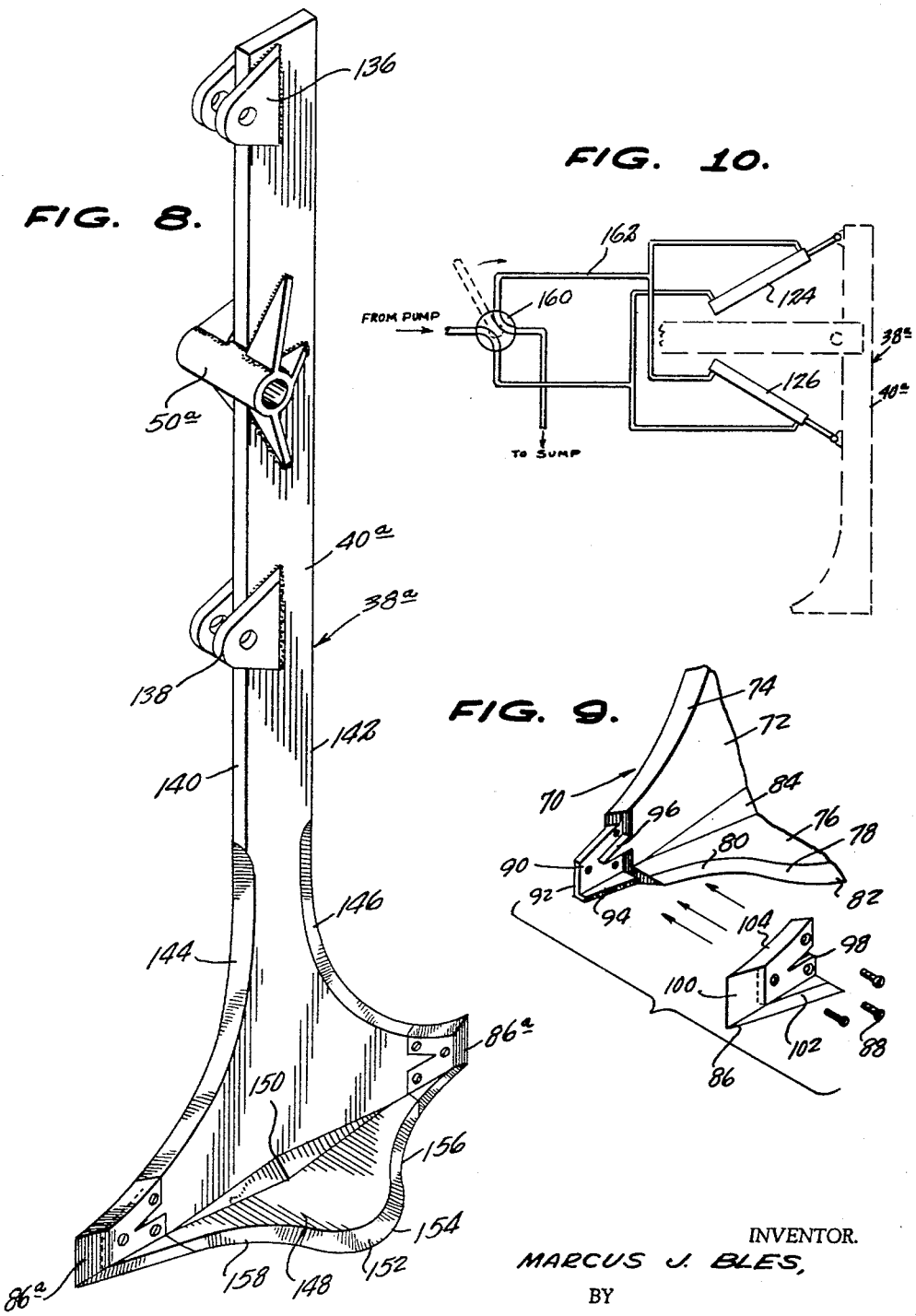

United States Patent Office 2,934,109
Patented Apr. 26, 1960

2,934,109

APPARATUS FOR CUTTING TREE STUMPS AND ROOTS

Marcus J. Bles, McLean, Va.

Application February 7, 1958, Serial No. 713,873

6 Claims. (Cl. 144—2)

The present invention appertains to a new and novel means for cutting and removing tree stumps and roots and constitutes an improvement over pending application Serial No. 708,287, filed January 10, 1958.

In such pending application, a tool is disclosed, which is particularly adapted to be mounted on and manipulated by a conventional back digger or similar conventional excavating or digging unit or machine.

The present invention contemplates the provision of a similar cutting tool but, realizing that farmers do not have the employment of such conventional back digger or excavating machine at hand, the present invention more particularly relates to the provision of a tree stump and root cutting tool which can be mounted on and manipulated by a conventional tractor.

Thus, the primary object of the present invention is to provide a tool for cutting tree stumps and roots, which tool can be mounted on a conventional tractor and can be manipulated or controlled by the conventional power output means of the tractor. In addition, the present invention contemplates the provision of mounting and supporting means for the tool, which means can be easily and sturdily attached to a conventional tractor so that the tractor can be converted into a machine for cutting tree stumps and roots.

Another important object of the present invention resides in the provision of a tool which can be pivotally mounted on a boom that is attached to the tractor and controlled by the power output means, which is conventionally associated with the tractor, the tool being formed and being mounted so that it can move in a curvilinear path about a horizontal axis and, during such movement, effect a cutting action in its clockwise and counterclockwise movements.

Another important object of the present invention is to provide a means for cutting tree stumps and roots, which means can be mounted on a conventional tractor and which can be employed to effect a simultaneous horizontal and vertical cut in a standing tree stump without any danger of the tractor being moved off balance and without the need for employing any additional structural operating means on the tractor, the conventional power output means of the tractor being sufficient to operate the tool.

A further important object of the present invention is to provide a tree stump and root cutting tool which is designed and shaped so as to, with a minimum of power output, produce a simultaneous horizontal and vertical cut in a standing tree stump and which, under the control of conventional power output means on a tractor, can have a power movement in both a clockwise and counterclockwise direction.

The foregoing and ancillary objects are attained by this invention, the preferred embodiments of which are set forth in the following description and illustrated in the accompanying drawings, wherein:

Figure 1 is a side elevational view of the tool and mounting means therefor of the present invention, showing the same in structural association with a conventional tractor;

Figure 2 is a top plan view of the tool and mounting means, showing in particular the boom structure;

Figure 3 is a cross-sectional view taken on line 3—3 of Figure 1;

Figure 4 is an enlarged perspective view of the cutting means provided on the lower end of the tool, shown in Figure 1;

Figure 5 is a side elevational view of the tool and mounting and operating means, which mounting means is hydraulically controlled through the conventional hydraulic power output means of a conventional tractor;

Figure 6 is a detailed, vertical sectional view taken on line 6—6 of Figure 5;

Figure 7 is a detailed, cross-sectional view taken on line 7—7 of Figure 5;

Figure 8 is an enlarged and detailed perspective view of the tool per se;

Figure 9 is a detailed, exploded perspective view of the cutting means on the lower end of the tool; and, Figure 10 is a diagrammatic view of the hydraulic operating means.

Referring now more particularly to the accompanying drawings and initially to Figures 1–4, the reference numeral 10 generally designates a conventional tractor or similar agricultural implement.

The tree stump and root cutting device 12 of the present invention is operatively mounted on and controlled by the tractor. The tree stump and root cutting device 12 includes a boom 14, which consists of longitudinally extending, spaced apart side bars 16 and 18. The side bars 16 and 18 are interconnected by transverse bars 20 and are connected together and rigidified by cross bars 22. The inner ends of the side bars 16 and 18 are fitted between upstanding ears 24 on the tractor frame and are pivotally connected to such ears by a pivot pin 26, so that the boom can move vertically about a horizontal axis.

A supporting arm 28 pivotally upstands from the tractor frame, having its lower end pivoted to the frame as at 30. The upper end of the supporting arm 28 is pivotally connected to a base arm 32, which is suitably connected to the tractor frame. Such upper end of the supporting arm 28 rotatably supports a multiple sheave 34, over which cables 36 are entrained, the cables being controlled by an operating sheave (not shown) which is actuated by the conventional power output controls of the tractor.

The boom 14 pivotally supports a tool 38, which vertically depends from the outer end of the boom and includes a flat shank portion 40. The tool is formed intermediate its upper and lower ends and, preferably, between its center point and the lower end, with apertured ears 42 that extend rearwardly, beyond the rear edge 44 of the shank portion. The ears 42 are welded or otherwise fixedly mounted on the opposing sides of the shank portion and project rearwardly beyond the rear edge 44 so as to rotatably support a pulley 46, which is mounted between and to the ears by means of a shaft 48 that is fitted in the apertures by the ears.

A sleeve 50 is transversely mounted on the rear edge 44 of the shank portion, adjacent the upper end thereof, by means of mounting and rigidifying webs 52. The sleeve 50 has a journal pin 54 rotatably disposed therein, with the pin being fixed to the side bars 16 and 18 of the boom, at the outer ends thereof, whereby the tool is pivotally attached to and supported by the outer ends of the side bars 16 and 18 of the boom. The upper reduced end 56 of the shank portion 40 of the tool pivotally receives and supports confronting bars 58, which rotatably support a sheath 60 over which the cables 36 are entrained.

A pulley 62 is rotatably mounted by bearing blocks 64 on the underside of the side bars 16 and 18 of the boom and a cable means 66 is entrained over the pulley and connected to the pulley 46 on the shank portion 40 of the tool. The cable means 66 passes over a guide pulley 68 on the upper side of the boom and is controlled by the conventional power output controls of the tractor, such controls being in the form of drums or sheaves which are operated by the power takeoff means of the tractor.

The tool 38 is formed in one piece and consists of the flat shank portion 40, which has a cutting means on its lower end. The cutting means 70, as shown more particularly in Figure 4, comprises an enlarged lower end portion 72 on the shank portion of the tool, the enlarged lower end portion 72 being substantially triangular in shape and having a curved rear edge portion 74, which is bevelled or otherwise formed so as to constitute a vertical cutting edge. The lower end of the lower end portion 72 is formed with a laterally outstanding, offset portion 76, which is substantially triangular in plan view and has an outer cutting edge 78. The cutting edge 78 consists of a leading concave portion 80 and a trailing convex portion 82, such cutting edge 78 cooperating with the cutting edge 74 so that the tool effects a simultaneous vertical and horizontal cut through standing tree stumps, as will be described. For the purpose of reinforcing the portion 76 and yet, so as to not produce any friction, when the cutting edges are moved through a standing tree stump, a very small gusset 84 is provided at the juncture between the portion 76 and the lower end of the shank portion 40, the gusset being triangular in shape and having a very small apex end, which is disposed at the minor rear end of the portion 76.

As shown more particularly in Figure 9, a replaceable cutting shoe 86 is provided for the leading edges of the cutting edges 74 and 78 of the tool. The shoe 86 which is preferably formed from magnesium but which may be formed from other sturdy, cutting stock, is secured by bolt means 88 to a supporting plate portion 90, which is integral with the lower end portion of the shank portion of the tool. The supporting plate 90 includes a vertical section 92 and a wedge shaped horizontal section 94. A triangular or wedge shaped locking tongue 96 is formed on one face of the vertical portion 92 and is provided to interlock with a V-shaped slot or groove 98 formed in the shoe, so as to locate the shoe in place. The shoe has a vertical, leading edge 100 and has a horizontal cutting edge 102, which complements the cutting edge 78, as shown in Figure 4. The shoe also has a cutting edge 104, which complements the cutting edge 74, as shown in Figure 4. In use, the shank portion is pivotally mounted, adjacent its upper end, on the outer end of the boom 14 by means of the sleeve 50 and the journal pin 54. The cable means 36 is provided to move the tool in a counterclockwise direction, while the cable means 66 is provided to swing the tool in a clockwise direction and constitutes the power means for effecting the cutting swing of the tool. The cable means 66, under the control of the operator of the tractor, serves to swing the lower cutting end of the tool into contact with a standing tree stump 106, as shown in Figure 1. As the cutting end of the tool is brought into contact with the tree stump, it effects a simultaneous horizontal and vertical cut with the leading cutting edge 100 of the shoe 86 first penetrating the tree stump and then being followed by the cutting edges 102 and 104 and the cutting edges 78 and 74.

It is to be particularly noted that the shoe will enter the tree stump, without creating any frictional resistance and will be immediately followed by the cutting edges 74 and 78. The reinforcing gusset 84, due to its size and the manner in which it is arranged, will not set up any undue frictional resistance, while still providing the necessary rigidification for the horizontal portion 76.

In the above described form of this invention, cable operating means is provided for actuating the tool 38. However, due to the fact that the tool is limited in its cutting action, because it can only effect a cutting action in a clockwise direction and, also, due to the fact that many tractors may not be adaptable for controlling the operation of the tool through a winch and cable means, a hydraulic operating means 108, which controls a double acting tool 38a is provided and is illustrated in Figures 5–8 and 10.

Referring more particularly to Figure 5, the tractor 10a is of conventional construction and is provided with a conventional hydraulic output system, including a pump means (not shown). The boom 14a, which is identical to the boom 14 is pivotally mounted as at 110 on the front of the tractor, though it can be as easily mounted on the rear or side of the tractor. A framework 115 is vertically mounted on the frame of the tractor and supports hydraulic lines 114. A double acting hydraulic cylinder 116 is pivotally mounted, as at 118 to the framework 115. The piston rod 120 of the cylinder is pivotally connected, as at 122, to the boom, adjacent the pivot 110 thereof and is provided to control the up and down swinging movement of the boom.

Hydraulic cylinders 124 and 126 are pivotally connected, as at 128 and 130, respectively, to the upper side and under side of the boom and have their piston rods 132 and 134 pivotally connected to pairs of apertured ears 136 and 138. The top cylinder 124 has its piston rod 134 connected to the ears 136, which are secured to the shank portion 40a of the tool 38a, at its upper end. The ears 138 are secured to the shank portion, intermediate the center thereof and the lower cutting end. The outer end of the boom is attached to the shank portion by means of the sleeve 50a and the journal pin 54a, in a manner identical to the mounting arrangement for the tool 38, as shown in Figure 1.

It is to be particularly noted that the lower cutting end 70a of the tool is formed with double acting cutting edges. In this regard, the hydraulic operation of the tool provides a power swing in both a clockwise and counterclockwise direction about the axis 54a. Thus, while the cable operating means can only effect a power swing of the tool, as shown in Figure 1, in a clockwise direction, the hydraulic cylinders 124 and 126 provide a power movement of the tool in both a clockwise and counterclockwise direction.

Accordingly, the lower cutting end 70a of the tool is formed on its rear and front edges 140 and 142 with vertical cutting edges 144 and 146, that are similar to the cutting edge 74 of the tool 38. A horizontal portion 148 extends laterally from the lower end edge of the cutting portion and is reinforced by a gusset 150. The horizontal portion 148 has a cutting edge 152, which includes a convex center section 154 and concave end sections 156 and 158. Cutting shoes 86a are mounted on the opposing ends of the end portion in a manner similar to that shown in Figure 9.

In use, it can be seen that the cylinders 124 and 126 will effect a power stroke of the tool 40a about the axis 54a so that the tool can be used to cut two standing tree stumps, at the same time.

As shown in Figure 10, a hand controlled valve means 160 is provided for controlling the operation of the cylinders 124 and 126. The valve means 160 controls the flow of the hydraulic fluid from the pump to the sump, and to the cylinders 124 and 126. The cylinders 124 and 126 are connected to the valve by lines 162, so that the one valve controls the operation of both cylinders. Thus, when the cylinder 124 is working with its piston rod 134 on its power stroke to swing the tool about the axis 54a in a clockwise direction, the cylinder 126 is being vented to permit its piston rod to move in a retracting stroke.

This combined action of the cylinders permits an easy control of their operation to effect the power stroke of the tool in both a clockwise and counterclockwise direction.

It is to be particularly noted that the tool and mounting and actuating means therefor can be easily installed on a conventional tractor and can be operated by the tractor operator by using the conventional power output controls which are a part of the tractor. Because of the arrangement of the boom and the pivotal arrangement thereof with the tool and the arrangement of the operating means, either the cylinders or the cable means, relative to the axis of the tool, there will be no possibility that the tractor can become off balance and the full power of the tool can be realized in cutting standing tree stumps.

While the preferred forms of the present invention have been described and illustrated herein, it is to be realized that other forms may be achieved, as come within the scope and spirit of the appended claims.

Having thus described this invention, what is claimed is:

1. A tree stump cutting and splitting apparatus comprising a mobile frame, a boom pivotally mounted on the frame for vertical swinging movement, a tool pivotally carried by the boom for movement about its pivot in a vertical plane, said tool being in the form of an elongated, single lever arm having upper and lower end portions, means pivoting the lever arm adjacent its upper end portion to the boom, means connected to the lever arm above and below its pivot for swinging the lever arm in a curvilinear path of movement about its pivot toward and away from the frame, said lower end portion of the lever arm having a vertical edge facing the frame, said vertical edge being provided with cutting means extending down to its lower end, said lower end portion of the lever arm having a side and a blade element extending laterally from the side at the lower end of the lower end portion and arranged in a plane at right angles to the side and the vertical edge and having an outer cutting edge that diverges outwardly from a juncture with the lower end of the vertical edge and its cutting means so that a combined horizontal and vertical cut is made in a tree stump upon each contact of the lever arm with the tree stump, the juncture of the cutting edges being constituted by a removable cutting shoe.

2. In combination with a tractor having a hydraulic output system, a tree stump cutting and splitting apparatus comprising a boom pivotally mounted on one end of the tractor for vertical swinging movement, a tool pivotally carried by the boom for movement about its pivot in a vertical plane, said tool being in the form of an elongated, single lever arm having upper and lower end portions, means pivoting the lever arm adjacent its upper end portion to the boom, hydraulic cylinders pivotally connected to the boom and extending above and below the boom, means pivotally connecting the piston rods of such cylinders to the lever arm above and below the point of pivotal attachment of the lever arm with the boom, said cylinders being connected with the hydraulic output system of the tractor for swinging the lever arm in a curvilinear path of movement about its pivot towards and away from the frame, said lower end portion of the lever arm having a vertical edge facing the frame, said vertical edge being provided with cutting means extending from a point spaced slightly below the lowermost pivotal connection with the lowermost hydraulic cylinder down to its lower end, said lower end portion of the lever arm having opposing flat sides lying substantially in the same plane as the vertical cutting edge, and a blade element extending laterally from one side of the lever arm at the lower end of the lower end portion and being arranged in a plane substantially at right angles to said side and the vertical edge and having an outer cutting edge that diverges outwardly from a juncture with the lower end of the vertical edge and cooperates with said vertical cutting edge so that a combined horizontal and vertical cut is made in a tree stump upon each contact of the lower end portion of the lever arm with the tree stump.

3. In an apparatus for cutting and splitting tree stumps, a tool comprising an elongated one-piece lever arm adapted to be mounted in a vertical position for curvilinear swinging movement about a horizontal axis, said lever arm having upper and lower end portions, means on the upper end portion for pivotally mounting the lever arm for vertical swinging movement, means provided on the upper end portion above and below said last named means for connecting the lever arm to a power means for producing the swinging movement of the lever arm, said lower end portion of the lever arm having a vertical cutting edge extending down to the lower end of the lower end portion and being inwardly curved, said lower end portion having opposing flat sides lying substantially coplanar with the vertical cutting edge, a plate laterally extending from one of the sides of the lowermost end of the lower end portion and having an outer cutting edge disposed at right angles to the vertical cutting edge and diverging from the vertical cutting edge and being joined with the lower end of the vertical cutting edge to define a cutting point therewith, said cutting point being constituted by a removable shoe.

4. In an apparaus for cutting and splitting tree stumps, a tool comprising an elongated one-piece lever arm adapted to be mounted in a vertical position for curvilinear swinging movement about a horizontal axis, said lever arm having upper and lower end portions, means on the upper end portion for pivotally mounting the lever arm for vertical swinging movement, means provided on the upper end portion above and below said last named means for connecting the lever arm to a power means for producing the swinging movement of the lever arm, said lower end portion of the lever arm having opposing front and rear edges, said edges being sharpened to constitute vertical cutting edges extending down to the lower end of the lower end portion and being inwardly curved, said lower end portion having opposing flat sides disposed substantially coplanar with the vertical cutting edges, and a plate laterally extending from one of the sides at the lower end of the lower end portion and having an outer cutting edge disposed substantially at right angles to the vertical cutting edges and diverging outwardly from the vertical cutting edges and being joined with the lower ends of the vertical cutting edges to define opposing common cutting points therewith and having a substantially convex central point on the outer cutting edge.

5. In an apparatus for cutting and splitting tree stumps, a tool comprising an elongated one-piece lever arm adapted to be mounted in a vertical position for curvilinear swinging movement about a horizontal axis, said lever arm having upper and lower end portions, means on the upper end portion for pivotally mounting the lever arm for vertical swinging movement, means provided on the upper end portion above and below said last named means for connecting the lever arm to a power means for producing the swinging movement of the lever arm, said lower end portion of the lever arm having opposing front and rearward edges, said edges being sharpened to constitute vertical cutting edges extending down to the lower end of the lower end portion, said lower end portion having opposing flat sides disposed substantially coplanar with the vertical cutting edges, and a plate laterally extending from one of the sides at the lower end of the lower end portion and having an outer cutting edge disposed substantially at right angles to the vertical cutting edges and diverging outwardly from the vertical cutting edges and being joined with the lower ends of the vertical cutting edges to confine common front and rearward cutting points therewith, said cutting edge of the plate having an outstanding convex portion lying substantially in a line intersecting and disposed at right angles to the longitudinal axis of the lever arm.

6. In combination with a mobile frame having a hydraulic output system, including a pump means, a tree stump cutting and splitting apparatus comprising a boom pivotally mounted on the frame for vertical swinging movement, a hydraulic cylinder pivotally connected between the frame and the boom and in communication with the hydraulic output system for controlling the vertical swinging movement of the boom about a horizontal axis, a tool pivotally carried by the boom for movement about its pivot in a vertical plane, said tool being in the form of an elogated, single lever arm having upper and lower end portions, means pivoting the lever arm adjacent its upper end portion to the boom for movement of the lever arm about a horizontal axis paralleling the axis of pivotal movement of the boom, hydraulic cylinders pivotally carried by the boom and extending above and below the boom and having operating piston rods, means pivotally connecting the piston rods to the lever arm above and below the pivotal point of attachment to the boom, said lower end portion of the lever arm having opposing front and rearward vertical edges, said edges constituting cutting edges and having lower end portions sloping outwardly from the longitudinal, central axis of the lever arm, said lower end portion of the lever arm having opposing flat sides lying substantially coplanar with the vertical cutting edges, and a blade element extending laterally from one side of the lever arm at the lower end of the lower end portion and being arranged in a plane substantially at right angles to said side and the vertical cutting edges, said blade element having an outer cutting edge that diverges outwardly from a juncture with the lower ends of the vertical cutting edges and is formed with a convex center portion, which lies in a plane intersecting and disposed substantially at right angles to the longitudinal axis of the lever arm.

References Cited in the file of this patent

UNITED STATES PATENTS

| | | |
|---|---|---|
| 555,804 | Cummings | Mar. 3, 1896 |
| 790,464 | Toler | May 23, 1905 |
| 984,146 | Lundghren et al. | Feb. 14, 1911 |
| 1,191,255 | Wilkes | July 18, 1916 |
| 1,919,075 | Rasmussen | July 18, 1933 |
| 2,388,461 | Baker | Nov. 6, 1945 |
| 2,701,591 | Kissner et al. | Feb. 8, 1955 |
| 2,768,499 | Pilch | Oct. 30, 1956 |
| 2,786,404 | Gardner | Mar. 26, 1957 |